Nov. 12, 1968     S. S. TOMTER     3,410,783

ELECTROCHEMICAL CELL FOR SEPARATION OF GASEOUS MIXTURES

Filed Feb. 2, 1966

Inventor
Scott S. Tomter
By Paul Shapiro
Attorney

United States Patent Office 3,410,783
Patented Nov. 12, 1968

3,410,783
ELECTROCHEMICAL CELL FOR SEPARATION
OF GASEOUS MIXTURES
Scott S. Tomter, Milwaukee, Wis., assignor to Allis-Chalmers Manufacturing Company, Milwaukee, Wis.
Filed Feb. 2, 1966, Ser. No. 524,642
6 Claims. (Cl. 204—266)

ABSTRACT OF THE DISCLOSURE

A system for separating an electrochemically activable gas from electrochemically inert gases wherein the activable gas is electrochemically reduced to a solvated species at an activation electrode of a direct current powered cell, and the solvated species is ionically conducted through an electrolyte within the cell to regenerate the activable gas at a cell regeneration electrode. To mitigate the problem of moisture balance control in the cell, fresh electrolyte is circulated in an electrolyte chamber adjacent to the regeneration electrode, and a pressure differential is maintained across the cell.

---

Figure 1:
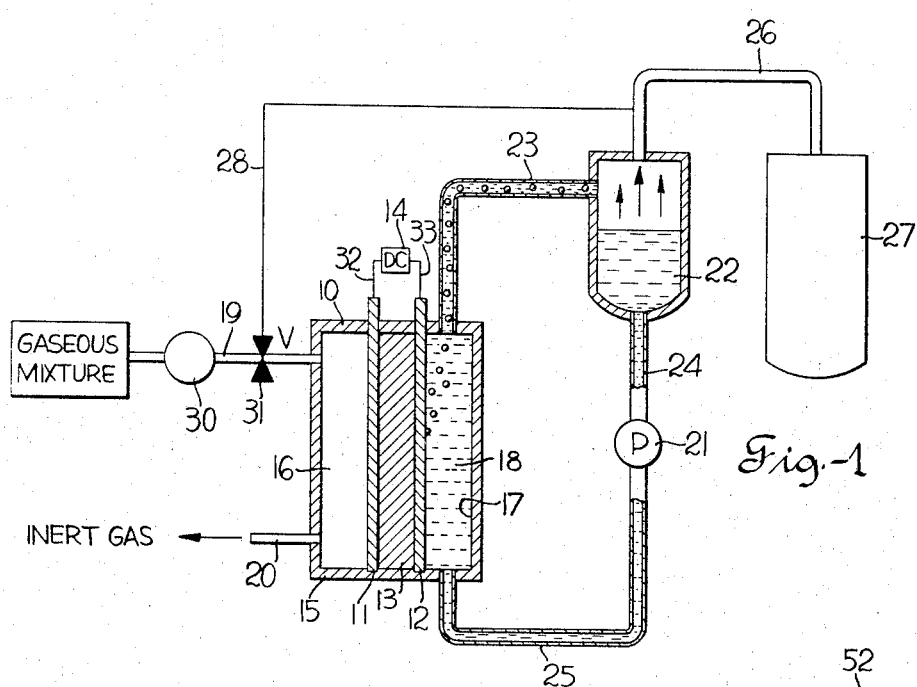

This invention relates to the electrochemical separation and purification of at least one gas from a mixture of a plurality of gases and more particularly, the invention relates to a means for controlling the moisture balance in an electrochemical cell used for the electrochemical separation.

In a copending patent application, Ser. No. 403,027, entitled "Electrochemical Purification of Gases," filed Oct. 12, 1964, now abandoned, in the names of Patrick G. Grimes and John N. Murray, there is disclosed a means for separating a gaseous mixture of an electrochemically activable gas and an electrochemically inert gas from each other, such as oxygen from air, in a direct current powered cell of the type comprising a pair of reversible gas permeable electrodes spaced by an electrolyte matrix, such as a fibrous membrane saturated with an aqueous electrolyte such as an aqueous solution of alkali hydroxide. The gaseous mixture to be separated is passed to the cell and is first circulated across the surface of a porous electrode having disposed thereon a gas activating catalyst, this electrode hereinafter referred to as the activation electrode. The activable gas in the gaseous mixture is electrochemically reacted at this electrode to form a solvated species of the activable gas in the electrolyte, which then migrates through the electrolyte to the second electrode of the cell where the solvated species is electrochemically reached to regenerate the activable gas and water, this electrode hereinafter referred to as the regeneration electrode.

For example, if oxygen is the gas to be activated and electrochemically separated from a gaseous mixture such as air, the gaseous mixture is circulated across the surface of a porous activation electrode of a direct current powered cell having disposed thereon an oxygen selective catalyst having no effect on the other constituents of the air mixture. The electrolyte, an aqueous alkali hydroxide, is contained in an electrolyte matrix separating the activation and regeneration electrodes. The oxygen in the air diffuses into the porous activation electrode, which is the cathode of the cell, and is electrochemically reduced at the interface of the electrode and the electrolyte contained in the electrolyte matrix to a solvated species according to the following equation:

$$O_2 + H_2O + 4e \rightarrow 4OH^-$$

or

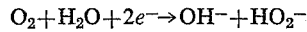

The solvated species formed by this reaction are conducted through the electrolyte in the matrix to the surface of the regeneration electrode, which is the anode of the cell, and is oxidized thereat to regenerate oxygen according to the following equation:

or

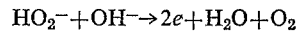

Although this method is extremely effective for the separation and purification of a diversity of gases from gaseous mixtures, one drawback to the efficiency of the system is the problem of moisture balance control at the electrolyte matrix immediately adjacent the electrodes of the cell. For example, as the solvated species is regenerated, the water which forms along with the regenerated gas tends to progressively dilute the electrolyte at the regeneration electrode until the electrolyte concentration at this electrode falls below the optimum concentration of the electrolytic cell. The ionic conductivity of the electrolyte decreases, and as the ionic conductivity decreases, cell resistance correspondingly increases thereby reducing the efficiency of the cell. At the activation electrode, the passage of the gaseous mixture to be separated through the gas space immediately adjacent the electrode inherently entrains a certain amount of moisture from the electrolyte matrix surface adjacent the electrode as well as evaporating water from the electrolyte matrix, thereby reducing the moisture content of the matrix and raising the resistance, and eventually, drying out the matrix to the point where it is irreparably damaged. Thus, the differences in electrolyte concentration at the electrode surfaces or the concentration gradient in the electrolyte matrix causes an increase in cell resistance which reduces the efficiency of the cell and severely limits the cell voltage at useful current outputs.

In accordance with the present invention, the aforementioned problems of moisture balance control in direct current powered electrochemical cells used to separate a gaseous mixture of an electrochemically activable gas and an electrochemically inert gas are avoided and the electrolyte is maintained at an effective operating level and concentration in an electrochemical cell of the present invention which comprises a cell having a porous activation electrode and a porous regeneration electrode separated by and in contact with an electrolyte matrix saturated with an aqueous electrolyte. The gaseous mixture to be separated is supplied under pressure to a gas chamber adjacent to the activation electrode. Aqueous electrolyte is circulated through an electrolyte chamber adjacent to the regeneration electrode into which the purified regenerated gas is evolved. The circulation of the electrolyte replenishes and maintains the moisture balance in the electrolyte matrix by diffusion through the porous regeneration electrode. To maintain adequate interfacial contact between the activable gas, electrolyte and catalyst surface and to prevent leakage of electrolyte through the porous activation electrode, a pressure differential is maintained across the cell by a pressure regulating control means which regulates the pressure of the gaseous mixture delivered to the gas chamber in response to the pressure of the gas produced at the regeneration electrode.

Figure 2:
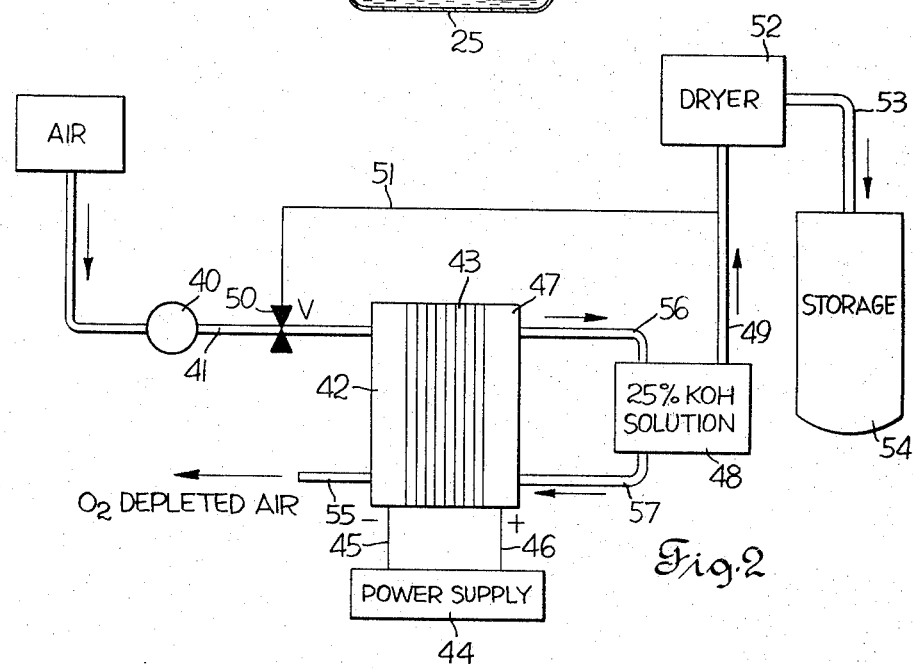

FIG. 1 illustrates, in schematic cross-section, one embodiment of a unit cell of the present invention; and FIG. 2 is a diagrammatic view of a gaseous separation system utilizing a multiple assembly of individual cells of the present invention which is employed for the separation of oxygen from air.

Referring now to FIG. 1, the cell 10 comprises a pair of gas permeable electrodes, activation electrode 11 and regeneration electrode 12 in direct contact with the

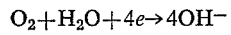

opposite surfaces of electrolyte matrix 13 saturated with an aqueous electrolyte and connected to a source of DC current 14 by leads 32, 33. The relative thickness of the electrodes 11, 12 and the matrix 13 as shown in the figure have been exaggerated for the purposes of clarity in the description. Actually in the preferred form, the electrodes and matrix may be but a few mils in thickness, the dimension not being critical. The electrodes 11 and 12 and electrolyte matrix 13 are supported in housing 15, which forms a gas reactant chamber 16 with the activation electrode 11 and an electrolyte chamber 17 with the regeneration electrode 12. Aqueous electrolyte 18 is contained in the electrolyte chamber 17.

The electrolyte matrix 13 saturated with the aqueous electrolyte serves a dual function. The matrix 13 maintains intimate contact between the interface of the electrolyte and the gas permeable electrodes 11 and 12 and also serves as a gas barrier to prevent diffusion of inert gas products to the regeneration electrode.

The gaseous mixture to be separated and purified, which may be for example air, is compressed in compressor 30 and introduced under pressure into the gas activation chamber 16 through gas conduit line 19. For example, in the case of air, where oxygen is produced at the regeneration electrode at ambient pressure, the air is introduced into the gas activation chamber at a pressure of about 5 to about 15 p.s.i. Portions of the gaseous mixture not reacting at the activation electrode remains in gas reactant chamber 16, and are exhausted through exhaust manifold 20.

To maintain the proper electrolyte concentration in the electrolyte matrix 13 adjacent to the surfaces of the electrodes 11 and 12, electrolyte solution is circulated by means of pump 21 from separator 22 to electrolyte chamber 17 interconnected by suitable conduit means 23, 24 and 25. During the operation of the cell, the electrolyte is circulated and withdrawn from the electrolyte chamber 17 via conduit means 23 and passed to electrolyte separator 22 wherein the regenerated gas formed at the regeneration electrode 12 is separated from the circulating electrolyte solution. In the separator 22, the regenerated gas disengages from the aqueous electrolyte and is de-entrained if necessary. Design details for the separator 22 are not shown for the separator 22, as separators of this nature are well known in the art. It is possible, if desired, to readjust the concentration of the electrolyte in the separator 22 as by heating to vaporize excess water obtained from the regeneration electrode 12.

The regenerated gas is withdrawn overhead from the separator via line 26 to storage means 27 and the electrolyte passes out of the separator via conduit means 24 to pump 21 wherein it is directed via conduit means 25 back to the electrolyte chamber 17.

A differential pressure control valve means 31 on conduit 19 is connected between compressor 30 and the gas reactant chamber 16 of the electrochemical cell and maintains a preset pressure differential between the gaseous mixture admitted to the cell and the regenerated gas withdrawn from the cell monitored to the valve 31 by the conduit 28. As the pressure of the regenerated gas is raised or lowered, the valve 31 opens or closes in response to this pressure to increase or decrease the pressure of the gaseous mixture delivered to the cell so as to maintain a constant differential pressure across the cell.

In this manner, any dilution of the electrolyte in the electrolyte matrix 13 adjacent the regeneration electrode 12 is compensated for by impregnation of the matrix 13 with the circulating electrolyte 18 of higher concentration and any increase in electrolyte concentration in the electrolyte matrix adjacent the activation electrode is rectified by convection of fresh electrolyte solution to the matrix interface contacting the activation electrode 11. By proper selection of the pressure of the gaseous mixture introduced into gaseous activation chamber 16, leakage of the electrolyte solution through the activation electrode 11 is avoided.

The electrodes used in the cell of the present invention must be porous so that the conductive surface will contact the electrolyte, absorb the gases employed and allow fresh eletcrolyte to diffuse through the matrix. The conductive surface may be itself a material which will act as a catalyst for the particular electrode reaction, or it may be coated with such a material. As an illustration, in electrochemical cells used to separate oxygen from air, the regeneration electrode may be formed of any electrically porous base such as porous sintered nickel or porous carbon having a catalytic layer disposed thereon of a metal of the eighth subgroup of the periodic table of elements such as iron, cobalt, palladium, platinum and mixtures thereof. The activation electrode may be formed of a porous electrode having a catalytic layer of silver disposed thereon or composed of a sheet of porous silver.

The electrolyte matrix is preferably a fibrous material having a high capillary potential higher than either electrode 11 or 12, preferably in excess of 100 lbs./in$^2$. Such fibrous material can be spun fibrous polypropylene, or asbestos, asbestos being the preferred fibrous material. After assembly, electrolyte matrix 13 is compressed against the electrodes 10, 11 in sealing engagement.

An electrolyte 18 is carried by electrolyte matrix 13. Suitable electrolytes are those materials that at the temperature of operation, and applied voltage, do not decompose, and are capable of transporting ionic charge. The electrolyte must also be capable of transporting a solvated species of the gas that is to be electrochemically separated from the gaseous mixture. Suitable electrolytes include the aqueous solutions of inorganic acids such as sulfuric acid, or bases such as alkali hydroxides, and their salts.

One skilled in the art, after being made aware of the method of our invention as outlined in this specification, when confronted with a plurality of gases that he desires to separate will be able to choose a suitable activating catalyst for activation electrode 11 that is selective to the gas to be activated and electrochemically separated from the remaining electrochemically inert gases. On the basis of what gas is to be activated and the electrolyte 18 within electrolyte matrix 13, one will also be able to determine with what polarity power source 14 is to be connected to electrodes 11, 12. The polarity of the connection quite clearly determines whether the activation and electrode regeneration electrodes function as a cathode or anode.

Referring now to FIG. 2 illustrating a system for the separation of oxygen from air, air is compressed in compressor 40 and is supplied by conduit 41 to a gas receiving cavity 42 of a direct current powered multiple cell assembly or module 43 from which the air is distributed by suitable manifolds (not shown) to the various unit cells of the assembly. The plurality of individual cells of the module 43 have sheet-like elements closely compacted in a casing defining gas activation and electrolyte chambers respectively and are connected in series to a DC power supply 44, by leads 45 and 46. The activation electrodes (cathodes) of the individual cells of the module 43 are porous silver electrodes and the regeneration electrodes (anodes) are comprised of platinum/palladium catalyzed porous nickel electrodes. The electrodes of the individual cells are separated by an asbestos matrix saturated with potassium hydroxide solution. The module 43 is operated at a temperature of 150° F. Air is supplied under pressure to the gas activation chambers adjacent to the cathodes of the individual cells of the module 43 from gas receiving chamber 42 of the module. The pressurized air diffuses into the porous silver cathode which is selective to the activation of oxygen and the oxygen in the air supplied to cathode is reduced thereat to form hydroxyl ion. The hydroxyl ion diffuses through the asbestos matrix in the cell and oxygen is regenerated at the anode by the oxidation of hydroxyl ion.

The regenerated oxygen gas is evolved at ambient pressure at the porous anode and removed from the surface of the anode by a solution of potassium hydroxide which is circulated through the electrolyte chambers of the individual cells from electrolyte receiving cavity 47. The potassium hydroxide solution diffuses through the porous anodes of the individual cells and communicates with the asbestos matrix of the cells thereby regulating the moisture balance in the electrolyte matrix which is upset by evaporation of electrolyte solution at the cathodes and dilution with water accumulation at the anodes.

A reservoir of electrolyte solution is contained in and circulated from separator 48 to the electrolyte receiving cavity 47 via lines 56 and 57. Oxygen gas which is produced in the module 43 is withdrawn from the circulating potassium hydroxide solution via line 49.

A pressure differential regulator 50 on conduit line 41, connected between the compressor 40 and the gas receiving chamber 42 of the module 43 maintains a pressure differential between the pressure of the air admitted to the module 43 and the pressure of the oxygen in line 49 evolved from the electrolyte solution which is continually circulated through separator 48 and adjusts any variance in the pressure differential by regulating the flow rate of air to the module. The oxygen pressure in the line 49 is monitored to the differential pressure regulator 50 by conduit 51.

The oxygen which is withdrawn from the separator 48 is passed to a suitable drying means 52 which removes traces of water vapor from the oxygen gas. The dried oxygen is then passed via line 53 to a suitable receptacle 54 for storage.

The gaseous components of air which are not activated at the cathode of the cell exit through outlets (not shown) in the gas activation chambers of the individual cells into exhaust manifold 55 of the module for disposal.

Using a module of the type illustrated in FIG. 2 comprised of 15 individual cells of the type illustrated in FIG. 1 having a porous silver cathode and a platinum/palladium catalyzed porous nickel anode (each cell having an area of 15 in.$^2$) air was passed to the gas receiving cavity 42 of the module at a flow rate of 10 liters/minute. The cell was operated at a temperature of 165° F. A pressure differential of 10 p.s.i. was maintained across the cell. 0.2 lbs./hr. purified oxygen gas was removed at ambient pressure from the 25% KOH solution which was circulated through the electrolyte receiving cavity 47 by the action of the evolving oxygen. Except for a water vapor content of about 0.5%, the purified oxygen was about 99.9% pure. The power supply 44 delivered 20 amperes at 10.5 volts to the module 43. Power consumption was 1 kwh./1.0 pound $O_2$ generated. The nonactivated gaseous product exhausted from the module 43 through line manifold 55 consisted of about 90.0% nitrogen, about 9.0% oxygen and about 1% rare inert gases.

The embodiments of the invention in which an exclusive property or privilege is claimed are defined as follows:

1. A system for separating an electrochemically activable gas from electrochemically inert gases in a gaseous mixture comprising an electrochemical cell having a housing means enclosing a porous activation electrode and a porous regeneration electrode and an electrolyte matrix saturated with an aqueous electrolyte positioned between and in contact with said electrodes, a gas reactant chamber defined between the activation electrode and the housing means, an electrolyte chamber defined between the regeneration electrode and the housing, said electrolyte chamber adapted to contain aqueous electrolyte, means for supplying the gaseous mixture under pressure to the gas reactant chamber, means for exhausting gas from the gas reactant chamber, pressure regulating control means operable in response to the pressure of the gas produced at the regeneration electrode, said control means operative to regulate the pressure of the gaseous mixture supplied to the gas reactant chamber such as to maintain a pressure differential across the cell, means for circulating electrolyte through the electrolyte chamber, means for separating gas produced at the regeneration electrode from the circulating electrolyte and said cell connected to a source of direct current.

2. A system according to claim 1 wherein said electrolyte is an aqueous solution of an alkali hydroxide.

3. A system according to claim 1 wherein the electrolyte matrix is asbestos fiber.

4. A system according to claim 1 wherein the activation electrode is comprised for porous silver.

5. A system according to claim 1 wherein the regeneration electrode is comprised of a catalyzed porous nickel electrode.

6. A system according to claim 1 wherein the regeneration electrode consists essentially of a platinum/palladium catalyzed porous nickel electrode.

References Cited
UNITED STATES PATENTS

| | | | |
|---|---|---|---|
| 1,588,214 | 6/1926 | Walsh | 204—129 |
| 3,017,338 | 1/1962 | Butler et al. | 204—129 |
| 3,057,794 | 10/1962 | Carlin | 204—252 |
| 3,316,163 | 4/1967 | Oser | 204—129 |

FOREIGN PATENTS 1,386,878  12/1964  France.

JOHN H. MACK, *Primary Examiner.*

D. R. JORDAN, *Assistant Examiner.*